Nov. 23, 1926.

W. E. TRENT 1,608,445

POWER PLANT

Filed August 18, 1919        7 Sheets-Sheet 1

Fig.1.

Patented Nov. 23, 1926.

1,608,445

UNITED STATES PATENT OFFICE.

WALTER E. TRENT, OF WASHINGTON, DISTRICT OF COLUMBIA, ASSIGNOR, BY MESNE ASSIGNMENTS, TO TRENT PROCESS CORPORATION, OF WASHINGTON, DISTRICT OF COLUMBIA, A CORPORATION OF DELAWARE.

POWER PLANT.

Application filed August 18, 1919. Serial No. 318,353.

The invention relates to improvements in power plants of the continuous combustion type. The invention deals more particularly with the general class of plant disclosed in my copending application, Serial No. 290,797 wherein a generator is employed for producing pressure gases to be expanded in engines.

From a more specific aspect, the invention comprises a power plant having suitable power generating means adapted to receive fuel, air and water, in combination with a plurality of cylinders or turbines adjacent said generating means adapted to constitute both power and compressor units independently operable relative to each other. The compressor unit with the air, fuel and water pumps, are of a substantially unitary construction constituting a compressor unit in communication with the generating means, while the power unit is independent of this unit and operable at different speeds relative thereto. It will be understood it is highly desirable to drive the compressors at variable speeds (relative to the power unit) inasmuch as an engine, or power unit, must be operable at a constant speed while subject to great load variation, and the independent operation of the compressor and pumps offers a means to deliver the variable amounts of air, fuel and water to produce most efficiently the energy required to maintain the desired speed under a range of load variation. The varying speed of the compressor unit is automatic in keeping with the pressure of the energy developed in the generator, so that should this pressure drop, the compressor cylinders will then operate at an increased speed to supply the required increased quantity of air, fuel and water to reestablish the working pressure. Inasmuch as the power unit is subject to variable loads, it is desirable that the compressor unit be under such control to permit a changing of the operation of the compressor unit from one pressure to another, in instances of this kind the pressure responsive control for operating the throttle is made adjustable so as to be made to respond to any desired working pressure which may be either raised or lowered while operating.

It is a further object of the invention to provide a power plant in which the operating pressure of the gases produced in the generator may be changed and varied at will without disturbing the operation of the generator.

In the accompanying drawings I have shown the preferred embodiments of the invention, but it will be understood that this disclosure is merely for the purpose of illustration, and that the invention is subject to many changes in construction, arrangement and combination of parts without departing from the spirit thereof.

Referring now more particularly to the drawings wherein like reference characters indicate corresponding parts, the numerals 1 and 2 indicate suitable generator units two forming a generator 2', the units being disclosed as connected by suitable conduits 3 and 4 the function of which will hereinafter appear. As the two generator units are of substantially identical construction a description of one will suffice for both. Each unit has an outer shell 5 receiving the capped plates 6, and spaced inner shells 7 and 8 supported by shoulders on the plates 9' and 10' in their proper spaced relations. The inner shell 8 constitutes the wall of the combustion chamber 9 extending substantially throughout the length of the generator unit and receiving suitable fuel and air to be burned therein and conveyed to the combustion chamber in a manner which will later appear.

By spacing the shells or walls, 5, 7 and 8 suitable distances apart, chambers 10 and 11 are provided, said chambers being substantially coextensive with the generator and adapted to receive air and water, respectively, the air being introduced to the chamber 10 through the air conveying pipe 12 while water is introduced to the chamber 11 by the water conducting pipe 13. A fuel which consists of powdered coal, oil or the like is introduced to the combustion chamber 9 of the generator for burning through the feeding nozzle 14 entering the combustion chamber and controlled by the supply valve 15. It will be apparent that air fed to the combustion chamber after passing through the air chamber 10 becomes intensely heated, and this air is introduced directly into the interior of the combustion chamber through the air conducting pipes 16 from the air reservoir or chamber discharging the air to completely intermingle with the issuing fuel passing through the feeding jet 14. The combustion is carried on continuously in the same manner as disclosed in my copending application, Serial No. 290,797, as it is manifest that oil and air are continually delivered to the generator. The water entering the water chamber 11 from a means which will be later described is introduced to the combustion chamber 9 in controlled volumes by the manipulation of the slide valve 17 operated by the operating members 18, this valve being moved lengthwise of the shell 8 so as to open or close the desired number of water spray openings 19 passing through the wall thereof. By introducing water to the flame the temperature and pressure of the resulting energy is under control, it being manifest that the water in the water reservoir 11 is, of course, heated by the heat radiation from the combustion chamber and when introduced to the flame in the combustion chamber, a composite energy of steam and gaseous products of combustion is formed, being of a controlled and regulatable temperature so that the engine which will hereinafter be described may be operated with a composite energy of a variable pressure and temperature or by separate energies of steam and gases. When the generator is cold combustion may be started by means of the spark plug 16' or any other suitable means such as a hot point or the like.

The air and water chambers of the two generator units are in communication, water passing from the chamber in the generator unit 1 to the water chamber in the generator unit 2 through the conducting pipe 3, while air enters the air chamber of the generator 2 through the valve controlled air pipe 4 connected with the operating shaft of an automatic governor geared with the power unit of the plant. Oil is supplied to the generator unit 2 by an oil pipe 21 in communication with the main oil feed and the spray of oil thereto is controlled in the same manner as hereinbefore described when dealing with the generator unit 1. As will later appear the generator 1 is for supplying the compressor driving unit, while the generator 2 is for developing energy for the power unit.

The plant is divided into a power unit A and compressor unit B, entirely independent of each other and operable at different rates of speed. The compressor unit is shown as consisting of the oppositely disposed compressor, cylinders 22, 23, 24 and 25, while the compressor power cylinders are indicated by the reference characters 26, 27, 28 and 29. The compressor cylinders are of the compound compression type, having main cylinder portions $26^a$ and reduced upper parts $27^a$ in which the compound pistons $28^a$ reciprocate. Upon the operation of the compressors air is forced from the main cylinders $26^a$ through the air feed pipes $29^a$ into a common receiver 30. Two sets of compressor cylinders being employed for each receiver, and from this receiver air is conveyed to the upper compressor cylinders $27^a$ for a high compression through the pipes 31 from where it is delivered to the coils 32 circulating around a portion of the compressor cylinders in the water jackets 33 and then conveyed to the air feeding pipe 12 for delivery to the generator. Adjacent each set of compression cylinders is a water and fuel pump 34, the water pump being designated by the reference character 35 receiving water from a supply pipe 36 controlled by a check valve 37 and delivering the water under pressure to the pipe 38 from where it is conveyed to the water jackets 33 of the compressors and the water jackets 39 of the different power cylinders which will be later more definitely described.

Oil is pumped in the reduced portion of the pump 34 being fed thereto by the oil feeding pipe 40 and discharged through the oil delivery pipe 41 leading to the oil feed pipes 14 and 21 of the generator units. Two of the pumps hereinabove described are employed as constituting a part of the compressor unit one being disclosed on each side of the generator and inasmuch as both of these units are of the same general character a description of only one is given.

Figure 4:
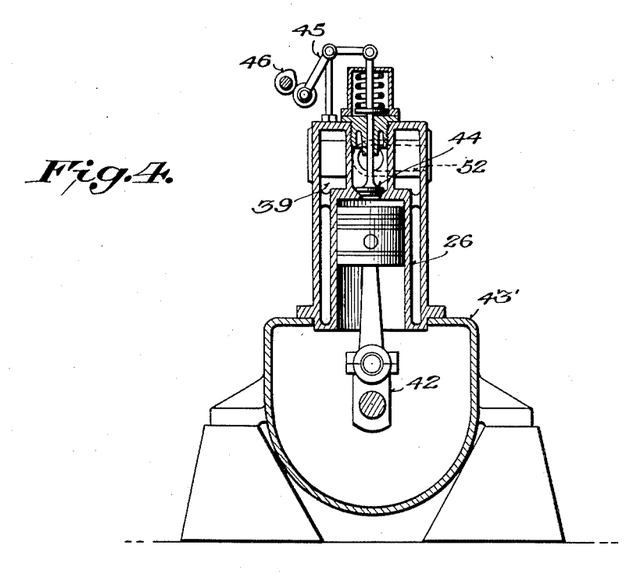
Fig. 4 is a detail view through one of the compressor cylinders.

The compressor pistons $28^a$ and the oil and water feed pump piston are driven from the crank shaft 42 through connecting rods mounted within the crank case 43' of the plant, this crank shaft being operated by the compressor operating cylinders 26 and 27 on one side of the generator, while a similar crank shaft is operated by the compressor operating cylinders 28 and 29 on the opposite side of the generator. The cylinders 26, 27, 28 and 29, receive their operating energy from the combustion chamber 9 of the generator 1, the energy passing through the conveying pipe or conduit 43, being admitted to the cylinders by the intake valves 44 operated by the operating cranks 45 in any suitable manner, such for instance, as by a cam shaft 46 as disclosed in Figure 4 of the drawings, the exhaust energy being discharged into the exhaust ports 47 leading to an exhaust pipe 48 from where the exhaust is carried to any suitable point of discharge, which may be a condenser or the like. It will be observed that the crank shaft 42 of the compressor unit is entirely independent and disconnected from the crank shaft of the power unit which will be later described.

The power unit may consist of any number of working cylinders in keeping with the uses of the plant, but in this illustration of the invention eight power cylinders are disclosed being indicated by the reference characters 49, and driven by an energy produced within the generator 2 and introduced thereto through the feed conduits 50, leading to manifolds 51 on each side of the generator, the manifolds communicating with the different intakes of the cylinders controlled by the intake valves 51' while the exhaust from the cylinders is discharged therefrom through the exhaust manifolds 52 into the main exhaust pipe 48. It will be apparent that power cylinders are driven continuously by the continuous introduction of the composite energy, or an energy of gases alone, to the cylinders for expansion, and it should also be observed that there are no valves located within the feed conduits 43 and 50 which would probably be a source of trouble inasmuch as the gases sometimes used for expansion are very hot, it being apparent that the present invention has in mind the utilization of a gaseous energy that may range from an extremely low to an extremely high temperature, the temperature of the energy being, of course, controlled by the quantity of water admitted to the gases.

The different power cylinders 49 are enclosed by the water jackets 39 into which water from the water pump 35 is conveyed by the water feeding pipes 38 this water absorbing the heat radiating through the walls of the cylinders as well as the heat of compression from the compressor cylinders and when in a heated condition is conveyed from the cylinder jackets through the water headers 53 to be delivered to the main water feed pipe leading to the water chamber 11 of the generator 1.

If it is desirable to operate the power unit at a constant speed, a suitable speed governor 54 of the centrifugal type may be geared with the crank shafts of the power units, one governor having an operating lever portion 55 connected with an operating arm 56 for rotating a rotary ported valve 57 located within the passage 4 controlling the admission of air from the generator 1 to the generator 2. It is manifest that by controlling this air admission from one generator to another, the character and volume of the energy produced in the generator 2 is varied thereby. It is, of course, obvious that often a constant speed engine is not desirable and should the same not be considered preferable at any time, the speed governor may be dispensed with.

In plants of the present type, it is highly preferable to have the compressor units and the power units separated from each other and operable independently so that one may be run at a speed different from the other. When operating engines under high steam or gas pressures, the compressor cylinders must have very tight piston rings and consequently these cylinders should not be operated at a greater speed than is necessary to furnish the required quantity of air, oil and fuel to the generator to build up a sufficient pressure therein for operating the power unit under its load. It, therefore, follows that a considerable amount of energy is wasted if the compressors are always driven at constant speed in consonance with the speed of the power unit and furthermore it will be seen that when the power unit has been subjected to an overload the compressors should then be operated at an increased speed, faster than the rotation of the engine shaft so as to supply an excess quantity of air, oil and fuel all of which are in determined ratios to take care of the overload and maintain the operation of the power cylinders at a constant or uniform speed. To this end, the present invention has in mind the provision of pressure responsive means for controlling the operation of the compressor unit. This means comprises a pressure cylinder for each half of the compressor unit, being designated by the character 57 having disposed therein a piston 58, normally urged downwardly by a coiled spring 59, the tension of which is adjusted by the spring pressure regulating member 60 carrying a suitable indicator 61 adapted to move over graduations disposed upon the surface of the cylinders 57. The energy feeding conduits 43 for the compressor cylinders are tapped intermediate their ends and leading from each of said conduits is a relatively small tube 61; each tube communicating at its opposite end with one of the cylinders 57 for introducing the energy that is being produced in the generator 1 to the lower part of the cylinder and exerting a pressure upon the piston therein in opposition to the tension of the spring 59. The upper end of each piston rod is connected with a sliding gate valve 62 located within the air feeding pipe 12 leading from the air compressor to the generator so as to vary and regulate the quantity of air passing from the compressors to the generator. In operation the spring adjusting member 60 of each responsive device is adjusted until the indicator reaches a determined character disposed upon the surface of the cylinder 57 designating each spring as being compressed so as to require a predetermined pressure of the fluid energy to overcome the tension thereof. During the operation of the plant should an overload be placed upon the power unit, then the pressure of the energy produced within the generator will drop, causing the spring to drive its piston downwardly opening the air passage and allowing a greater quantity of compressed air to enter the generator. Should the pressure, however, raise, then a reversal of this operation would take place, the pressure of the energy overcoming the tension of the spring thereby causing the air passage to close so that at all times irrespective of the load placed upon the engine only a sufficient quantity of air is introduced to the generator to produce an energy sufficient to take care of this load.

From the foregoing it will be seen that the compressor unit is entirely independent and separate of the power unit, but variable speed and change of performance of the compressor is changed by the power unit according to its needs, permitting one to operate at a different speed relative to the other as the occasion may require, it being manifest that this is desirable in many instances. When the plant is at rest, at which time the supply of energy to the power unit will be cut off the compressor unit only will operate at a sufficient speed to maintain an energy of a pressure that is capable of taking up the engine load when the plant is to be again operated. This will require only the utilization of a small amount of fuel materially reducing the cost of operation of the plant, yet at all times producing in the generator, an energy of a pressure capable of picking up the engine load. Then again when starting the plant the gas pressure may be produced within the generator by an operation of the compressor unit alone, the power unit remaining idle until an energy having the proper characteristics has been developed, it being seen that in an operation of this kind the compressor unit will operate upon an energy of a low temperature and pressure sufficient to drive the compression unit thereby building up the proper gas pressure in the generator which may be then introduced to the power unit when such pressure has been reached to enable the power unit to pick up its load.

Figure 5:
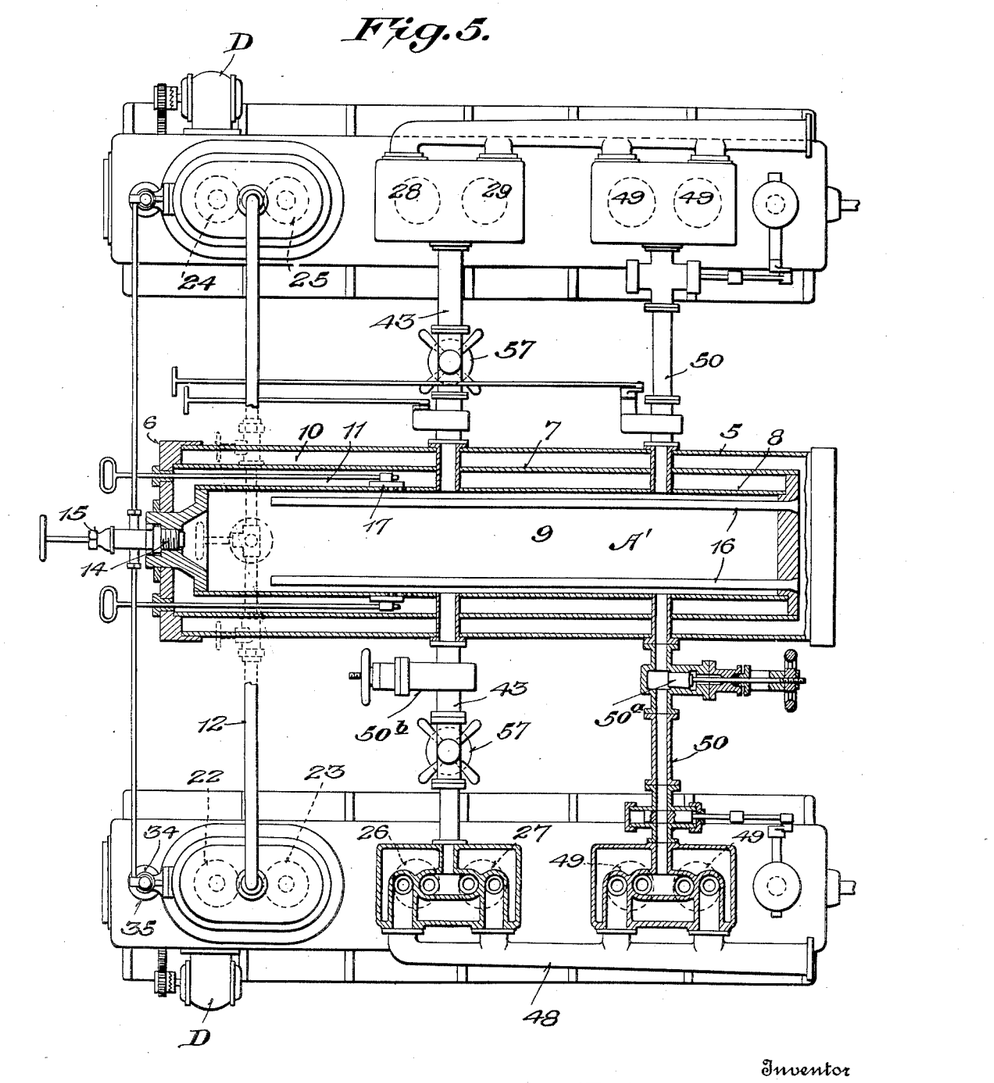
Figs. 5, 6 and 7 are views of a modified form of the device.
Figure 6:
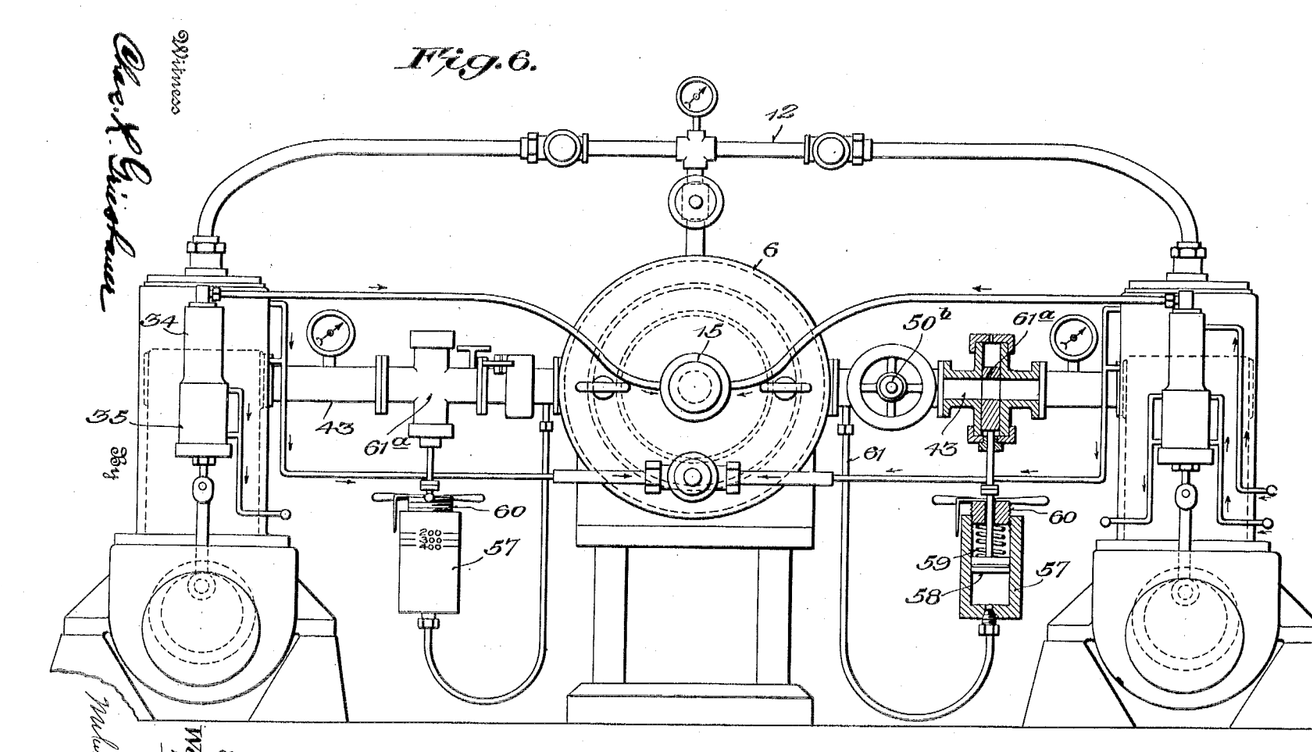
Figure 7:
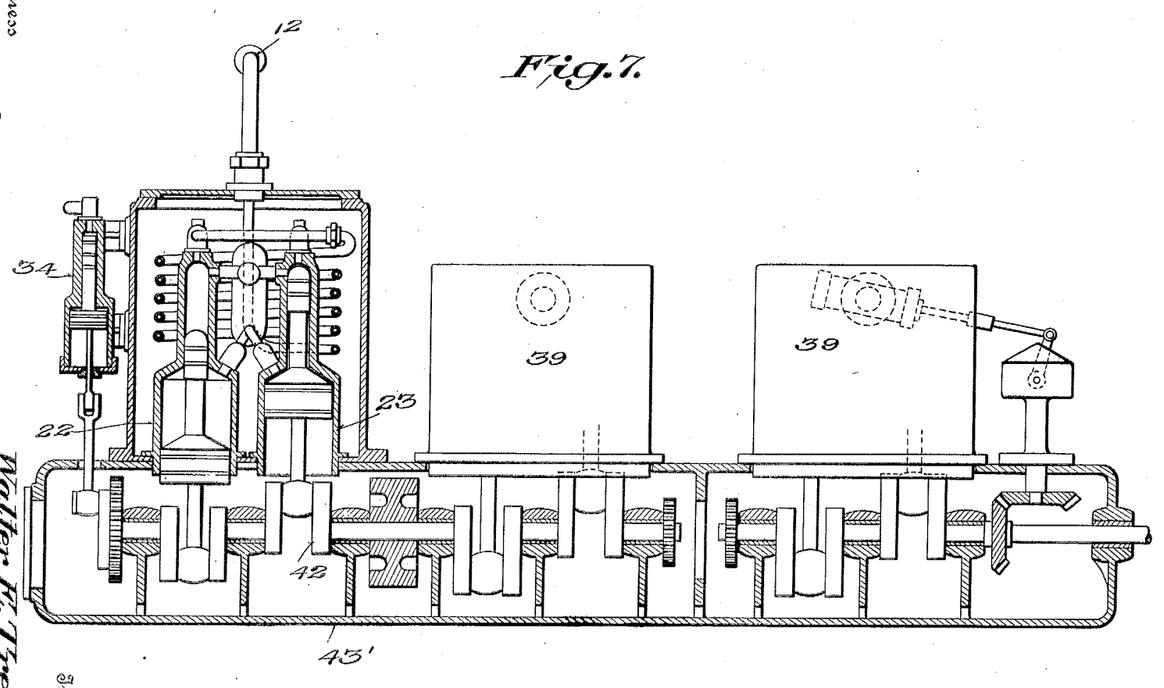

It frequently occurs in the operation of a plant of this character that it is desirable to change the operating pressure of the power unit from one point to another, as for instance, from 300 to 350 pounds of pressure to increase the capacity of the plant during a period of overload, and in following the present invention this may be accomplished by adjusting the pressure regulating elements 60 so as to compress the springs acting in opposition to the pressure of the energy entering the cylinders 57. To facilitate a change of this character while the plant is in operation, the pressure responsive cylinders 57 are provided with graduation marks as heretofore described adapted to be brought in registry with the indicators 61 attached to the spring adjusting elements 60 of the different pressure responsive cylinders 57. In Figures 5, 6 and 7, I have disclosed another form of the invention wherein a single generator is employed in lieu of the generators 1 and 2 illustrated in the preferred embodiment, the said generator being indicated by the reference character A' and is of a construction substantially identical with the construction of the generator units 1 and 2. In this figure the compressor unit, which is of the same construction as the compressor unit hereinbefore described is entirely independent of the power unit, air being supplied to the generator A' from the compressor cylinders 22, 23, 24 and 25 through the air feeding conduit 12 leading to the generator. It will be observed in this figure that the air feeding conduit 12 is not provided with a pressure responsive valve as in the preferred form, the pressure responsive devices in this modified construction comprising the cylinders 57 having the pistons 58 therein, said cylinders being located below the feeding conduits 43 leading to the compressor driving cylinders 26, 27, 28 and 29. The conduits 43 are tapped by the conducting tubes 61 of the same formation as disclosed in Figure 1 of the drawings, leading to the underside of the cylinders 57, having the reciprocating pistons therein normally urged downwardly by the coiled springs 59 tensioned by the adjustable element 60 and having the graduation marks and cooperating indicators carried on the cylinder and the adjustable element so as to regulate the pressure required on the part of the motive energy to move the piston. The pistons carry the usual rods, being connected with gate valves 61ª for varying the cross sectional area of the feed conduits 43 whereby the speed of the compressor cylinders 26, 27, 28 and 29 are automatically varied in keeping with the pressure of the energy being produced in the generator. It will be manifest that if the plant is set to operate at a given pressure, should the pressure of the energy produced fall below this point, then the pistons 58 will drop in the cylinders 57 and cause an opening of the valves in the feed conduits 43 permitting a sufficient volume of the gaseous fluid to pass to the compressor operating cylinders to speed up the compressor and its associated air and oil pumps so as to build up the pressure to the desired point in the generator capable of taking care of the engine load. The lower cylinders 49 are fed by the feeding conduits 50 leading from the generator, manually controlled valves 50ª being located in said conduits to close the supply of expansive fluid to the cylinders, or to vary the cross section area of the conduit thereby permitting a predetermined volume of the gaseous fluid to enter the cylinders. Similar manually controlled valves 50ᵇ are likewise placed in the energy feeding conduits 43 leading from the generator to the compressor engines.

Figure 1:
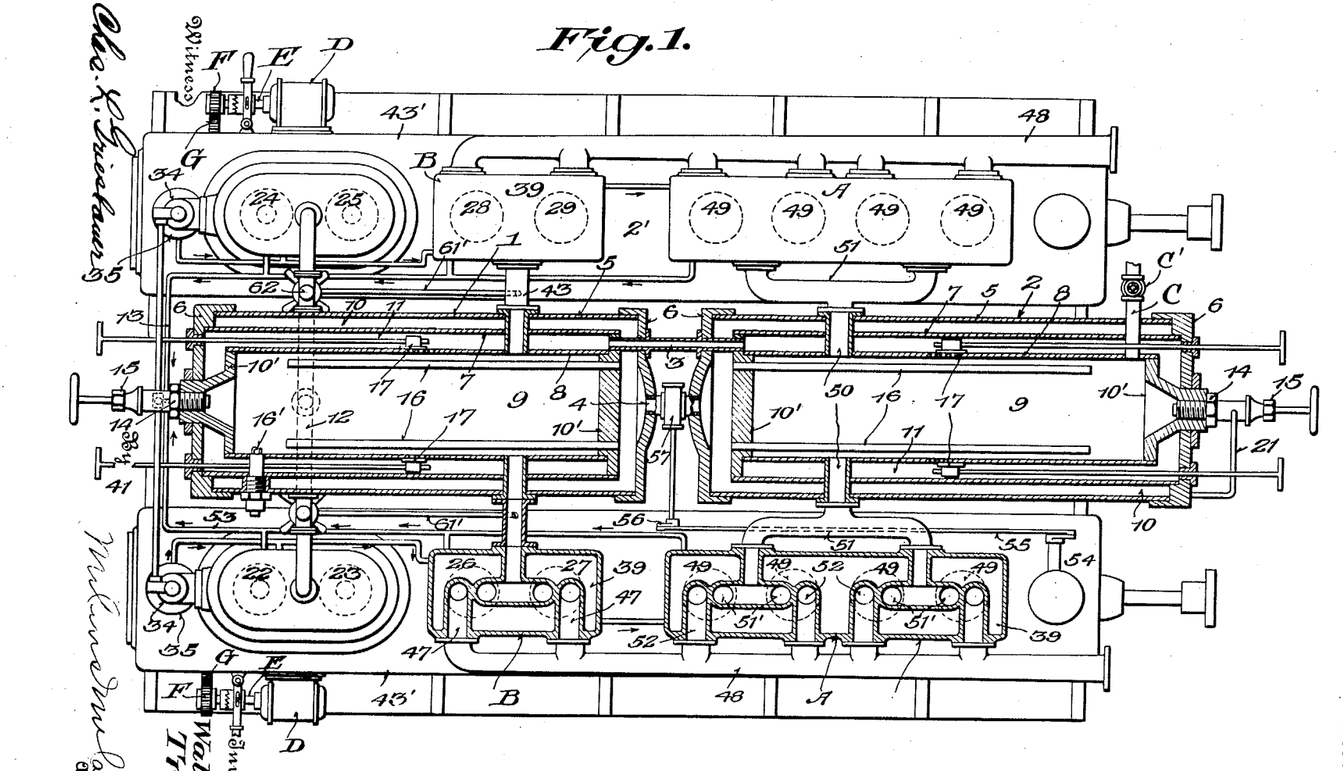
Fig. 1 is a plan view with parts in section.
Figure 2:
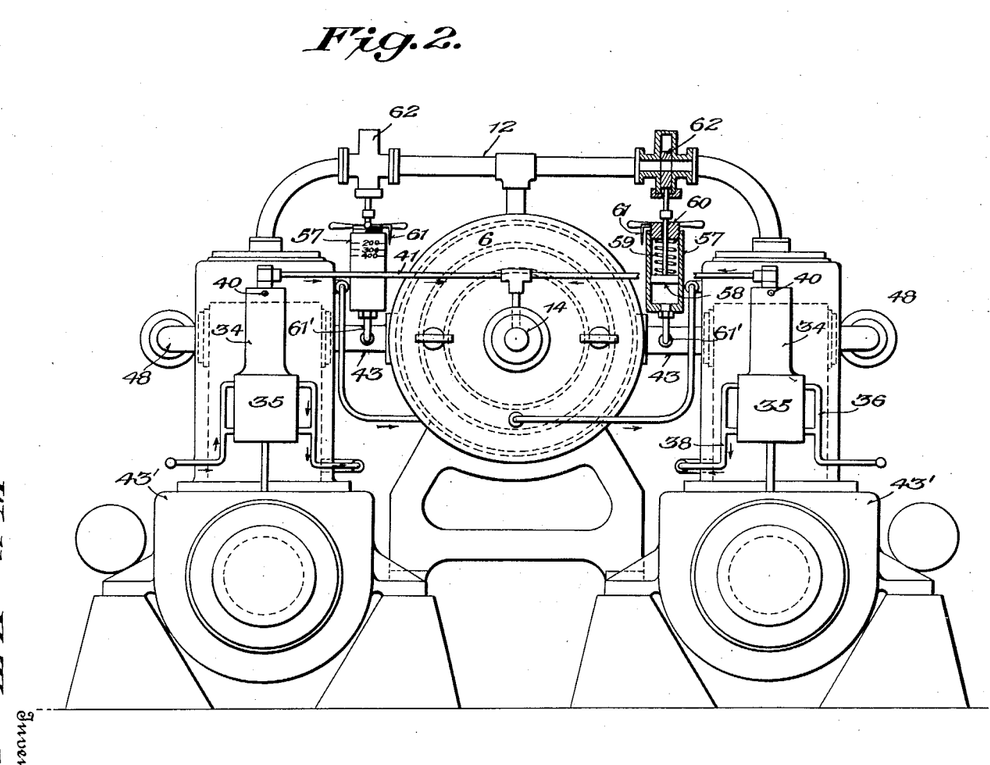
Fig. 2 is a side elevation.
Figure 3:
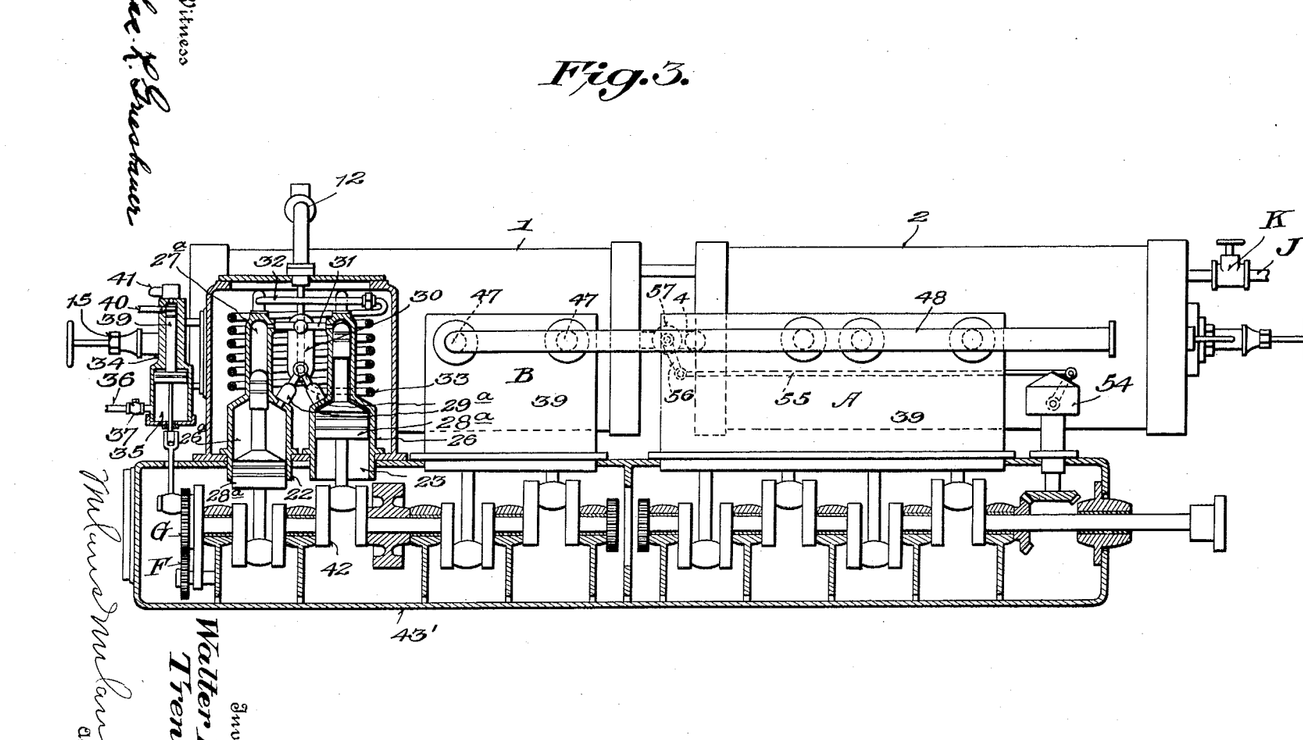
Fig. 3 is a side elevation with parts in section.

The generator units 1 and 2, Fig. 1, may be provided with energy conducting pipes C having suitable controlling valves C' therein by which the energy produced in the generators may be conveyed to any desired point of use, such as an auxiliary engine or the like. It will also be apparent that the energies produced in generator units 1 and 2 shown in Figures 1 of the drawings may be of a somewhat different nature if so desired inasmuch as the fluid controlling valves 17 maniplated by the operating levers are independently adjustable and this permits the temperature and character of the expansive fluid produced in one generator to be varied relative to the other. In starting the plant it may also be advisable at times to utilize an auxiliary motor and to this end, I have disclosed an electric motor D located upon the base of the plant having an armature shaft E adapted to drive a pinion F meshing with a pinion G disposed upon the crank shaft of the compressor unit. One of these engines may be employed on each side of the generator and such a structure as this is disclosed in the drawings.

The water chamber of the generator 2 may be provided with a valve control water outlet J leading to a condenser or the like, being normally closed by the valve K to allow an escape of the water in the event the generator is producing combustion gases alone to avoid undesirable temperatures.

Having thus described the invention, what I claim is:—

1. In a power plant, the combination with a generator, said generator having a combustion chamber, and water and air chambers disposed around said combustion chamber, means for introducing in determined ratios air and a fuel to the combustion and air chambers, means for introducing water to the water chambers, means for varying the quantities of air and fuel delivered to the generator responsive to the fluid pressure generated therein, a power unit, and means for introducing the energy produced in the generator to said power unit.

2. A power plant of the character described comprising a generator consisting of two units having communicating air and water chambers, of an air compressor for delivering air to said chambers, means for introducing water to the water chambers, means for introducing fuel to the generators, an engine for driving the air compressor receiving an energy from one generator, and a power unit independent of the compressor unit and operable at different speeds relative to the speed of the compressor engine and receiving an energy from the other generator unit.

3. A power plant of the character described comprising a generator consisting of two units having communicating air and water chambers, of an air compressor for delivering air to said chambers, means for introducing water to the water chambers, means for introducing fuel to the generators, an engine for driving the air compressor receiving an energy from one generator, and a power unit independent of the compressor unit and operable at different speeds relative to the speed of the compressor engine said power unit communicating with the other generator unit, and means controlling the passage of air between the two generator units.

4. A power plant of the character described comprising independent power units operable at different speeds relative thereto, of a generator comprising a plurality of units each having air and water chambers therein adapted to be in communication with the other, means for introducing air, water and fuel to the generator units for the production of an energy therein, means for conveying the energy produced in the generator units to different power units, substantially as described.

5. A generator of the character described comprising a plurality of generating units, means for introducing fuel to each of said units to be delivered to the combustion chambers thereof, means for introducing air to one of the units, and means for connecting said units whereby a portion of the air delivered to one will be transferred to the other, a prime mover, connections between one of said units and the prime mover for supplying an energy thereto, and a compressor unit, and connections between said compressor unit and said other generating unit.

6. A generator of the character described comprising separate generator units, means for introducing fuel to each of said units, means for introducing air to one of the units, means for connecting said units whereby a portion of the air delivered to one is transferred to the other, in combination with separate engines, and means for conveying the fluid pressure produced in one of said units to one engine and in the other unit to another engine.

7. A generator of the character described comprising a plurality of generating units, means for feeding fuel and air to each of said units, said units having water chambers and water feeding means therefor, and means for establishing a communication between the respective chambers of said units, and means connecting said units whereby a portion of the air delivered to one will be transferred to the other, a prime mover receiving energy from one unit, and an independently operable motor receiving its energy from the other unit.

8. A generator of the character described comprising a plurality of generating units, means for feeding fuel and air to each of said units, said units having water chambers and water feeding means therefor, and means for establishing a communication between the respective chambers of said units, and means connecting said units whereby a portion of the air delivered to one will be transferred to the other, in combination with separate engines, each having a fluid pressure supply from one of said units.

9. The combination with a generator comprising separate units having air and water chambers communicating with one another, means for introducing fuel to each of said chambers, and for introducing air and water thereto, and separate fluid energy discharge conduits leading from said units, a prime mover receiving energy from one of said conduits, and a compressor unit receiving energy from the other.

10. In a power plant, the combination with a generator having a combustion chamber, and water and air reservoirs within said generator around the combustion chamber, of means for introducing to said generator oil and air in determined variable ratios, the air being introduced to the air reservoir, means for delivering water to the water reservoir, said water reservoir having a communication with the combustion chamber, a power unit, and means for introducing energy produced in the generator to said unit.

11. In a power plant, the combination with a prime mover, a compressor unit independently operable thereof, and having an air compressing cylinder and an engine therefor, water jackets surrounding said unit, a generator having a combustion chamber, air and water jackets around said chamber, means for feeding air from said compressor to said air chamber, means for feeding water to said jackets and for introducing said water in a heated condition to said water chamber, means for feeding fuel to the generator, independent fluid pressure lines from said generator to said compressor engine and said prime mover whereby said engines may operate at variable relative speeds.

12. In a power plant, the combination with a prime mover, a compressor unit independently operable thereof, and having an air compressing cylinder and an engine therefor, water jackets surrounding said unit, a generator having a combustion chamber, air and water jackets around said chamber, means for feeding air from said compressor to said air chamber, means for feeding water to said jackets and for introducing said water in a heated condition to said water chamber, means for feeding fuel to the generator, independent fluid pressure lines from said generator to said compressor engine and said prime mover whereby said engines may operate at variable relative speeds, and automatically acting means for maintaining a constant pressure in said generator including a fluid pressure responsive regulator, a conducting line leading to said regulator from said passage to the compressor engine, and a valve disposed within the air feeding means operated by said regulator for controlling the admission of air to said air chamber.

13. In a power plant, the combination with a fluid pressure generator, of a pair of prime movers, one disposed on each side of said generator, compressor units disposed on each side of the generator, each including a compressor cylinder and an engine therefor, said generator being provided with a combustion chamber and surrounding air and water chambers, means for introducing air from said compressor cylinders to said air chamber, means for introducing water to the water chamber, means for controlling the passage of water from said water chamber to the combustion chamber, means for introducing fuel to the combustion chamber, and independent fluid pressure discharge lines leading to said prime mover and to said compressor engines.

14. In a power plant, the combination with a fluid pressure generator, of a pair of prime movers, one disposed on each side of said generator, compressor units disposed on each side of the generator, each including a compressor cylinder and an engine therefor, said generator being provided with a combustion chamber and surrounding air and water chambers, means for introducing air from said compressor cylinders to said air chamber, means for introducing water to the water chamber, means for controlling the passage of water from said water chamber to the combustion chamber, means for introducing fuel to the combustion chamber, and independent fluid pressure discharge lines leading to said prime mover and to said compressor engines, and means responsive to the fluid pressure in said generator for maintaining a constant pressure therein comprising a pressure regulator, a valve operated thereby disposed within the air feeding line, and a connection between the generator and said regulator.

In testimony whereof I hereunto affix my signature.

WALTER E. TRENT.